United States Patent [19]
Gordon

[11] Patent Number: 5,370,081
[45] Date of Patent: Dec. 6, 1994

[54] TANK COVER V

[76] Inventor: Richard A. Gordon, 95 W. 3rd St., Freeport, N.Y. 11520

[21] Appl. No.: 168,653

[22] Filed: Dec. 16, 1993

Related U.S. Application Data

[63] Continuation-in-part of Ser. No. 906,510, Jun. 30, 1992, abandoned, which is a continuation-in-part of Ser. No. 614,584, Nov. 16, 1990, Pat. No. 5,138,976.

[51] Int. Cl.⁵ .............................................. A01K 63/00
[52] U.S. Cl. ..................................... 119/265; 220/323
[58] Field of Search ............... 119/245, 247, 265, 266; 220/323, 210

[56] References Cited

U.S. PATENT DOCUMENTS

| | | | |
|---|---|---|---|
| 4,576,115 | 3/1986 | Gordon | 119/265 |
| 4,920,922 | 5/1990 | Tominaga | 119/265 |
| 5,000,117 | 3/1991 | Gordon | 119/265 |
| 5,005,522 | 4/1991 | Gordon | 119/265 |
| 5,138,976 | 9/1992 | Gordon | 119/265 |

*Primary Examiner*—John G. Weiss
*Attorney, Agent, or Firm*—Bauer & Schaffer

[57] ABSTRACT

A cover for an animal tank is providing having oppositely outwardly facing hooks thereunder. One of the hooks is fixed in position on the underside of the frame, and the other hook is mounted to the bottom of a slide, which is slidably mounted underneath the frame. When the cover is placed on an animal tank and the lock plate is slid outwardly in the frame and the frame is slid in the opposite direction on the top of the tank, the oppositely outward facing hooks engage underneath the interior peripheral shelf of the rim of the tank, securing the cover to the tank.

7 Claims, 2 Drawing Sheets

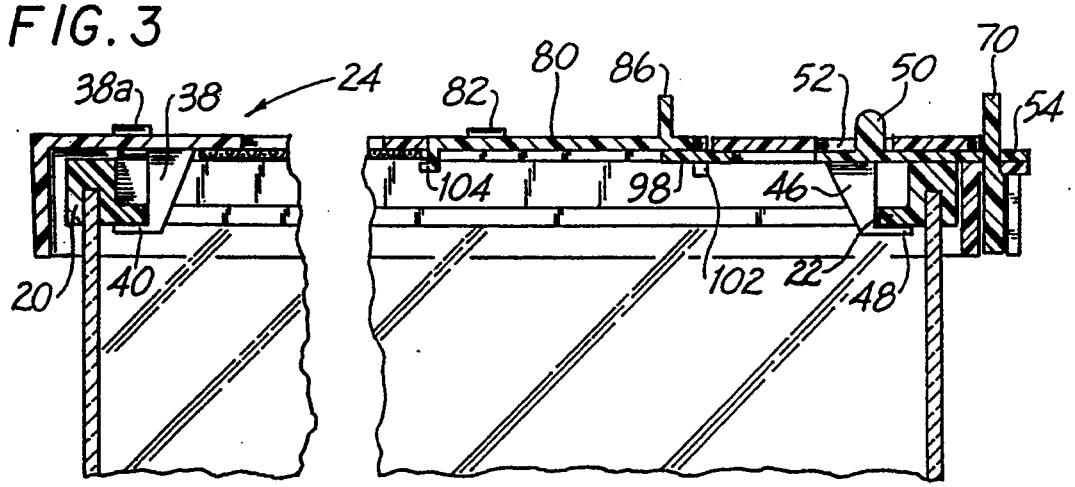
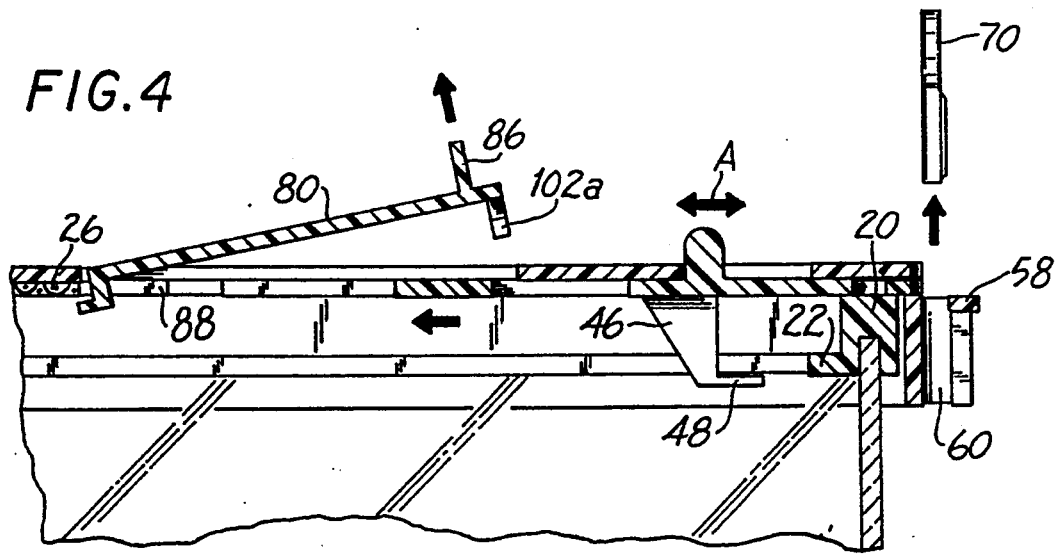

TANK COVER V

RELATED APPLICATIONS

This application is a continuation-in-part of copending application Ser. No. 07/906,510, filed Jun. 30, 1992, now abandoned, which is a continuation-in-part of application Ser. No. 07/614,584, filed Nov. 16, 1990, which is now U.S. Pat. No. 5,138,976, issued Aug. 18, 1992, for which all benefits are claimed.

FIELD OF THE INVENTION

This invention relates to an improved cover for an animal tank. More particularly, it relates to an improved cover, for positively securing the cover to the tank to prevent unintentional removal of the same from the tank, as well as to prevent small animals from escaping from the tank, while at the same time permitting access to the tank for purposes of providing food and water to an animal or animals in the tank.

BACKGROUND OF THE INVENTION

It is well known that aquarium-type tanks are often used to house lizards, snakes, ferrets, and the like as well as fish. Tanks so used require covers to prevent the unwanted egress of the inhabitants as well as to prevent unwanted entry of animals or humans, particularly children, thereto.

In addition to the above-mentioned copending application, which is parent to the instant to the instant application, applicant is also the owner of U.S. Pat. Nos. 4,576,115; 5,000,117; and 5,005,522 and copending U.S. patent application Nos. 205,311 and 393,575, in which are described several tank covers which have been found to be quite useful and widely accepted by consumers.

An important feature of an effective animal tank cover is that it should fasten securely to the tank so that animal inhabitants thereof cannot manipulate themselves and escape, while as the same time preventing unwanted access to the tank by animals or humans from the outside, but still allowing limited access to the tank without the need to remove the cover for purposes of providing food and/or water to animals inhabiting the same. However, such a cover should also be easily and quickly removable so the inhabitants can be removed for purposes of cleaning the tank as well as reducing the time during which the animals would have the opportunity to escape and which is also structured to permit light and air to freely pass into and out of a tank with which it is employed.

The present invention fulfills such needs.

SUMMARY OF THE INVENTION

According to the invention, a cover is provided for a reptile tank, fish tank, or a similar animal tank, which has an open top and peripheral side portions having a peripheral band forming a projecting shelf about its inner periphery. The cover consists of a flat screen attached integrally to a continuous frame, the cross section of which comprises a horizontal wall adapted to rest on top of the tank and a vertical wall adapted to fit over the outer peripheral side portion of the top of the tank. The frame is provided with a plurality of depending hook-like brackets secured to the underside of the horizontal wall and is provided with tabs, forming an outwardly directed horizontal flange adapted to engage underneath the interior shelf of the peripheral band. At least one set of such tabs is fixed directly to the frame along one edge thereof, and at least one set of such tabs is mounted on a movable slide which is moveable towards and away from the other edge of the frame and the movable slide being provided on its outer side with a lock plate.

Thus configured, the frame is placed on top of the tank, first engaging the fixed tab flanges underneath the interior shelf of the tank at one end. Subsequently, the other end of the frame is lowered onto the tank, and the lock plate is slid outwardly in opposition to the fixed tabs so as to cause the tabs to secure underneath the interior shelf.

In a modification of the invention, the area of the screen is secured and the area of the horizontal wall of the frame is increased and provided with a slidable door, which cooperates with an extension located on the movable slide which permits the door to be locked and unlocked, thus providing access to the tank without removing the cover and, as well, secure locking of the door when it is in a closed position. Still further, snap-in insert covers are provided to close the openings made through the horizontal wall in forming the integral tabs at one end of the frame.

Full details of the invention are set forth in the following description and the accompanying drawings.

BRIEF DESCRIPTION OF THE DRAWINGS

In the drawings:

FIG. 3 is a partial lateral sectional view of the tank and cover as shown in FIG. 1 taken along line 3—3;

FIG. 4 is an enlarged view of the forward end of the frame shown in FIG. 3;

DETAILED DESCRIPTION OF THE INVENTION

Figure 1:
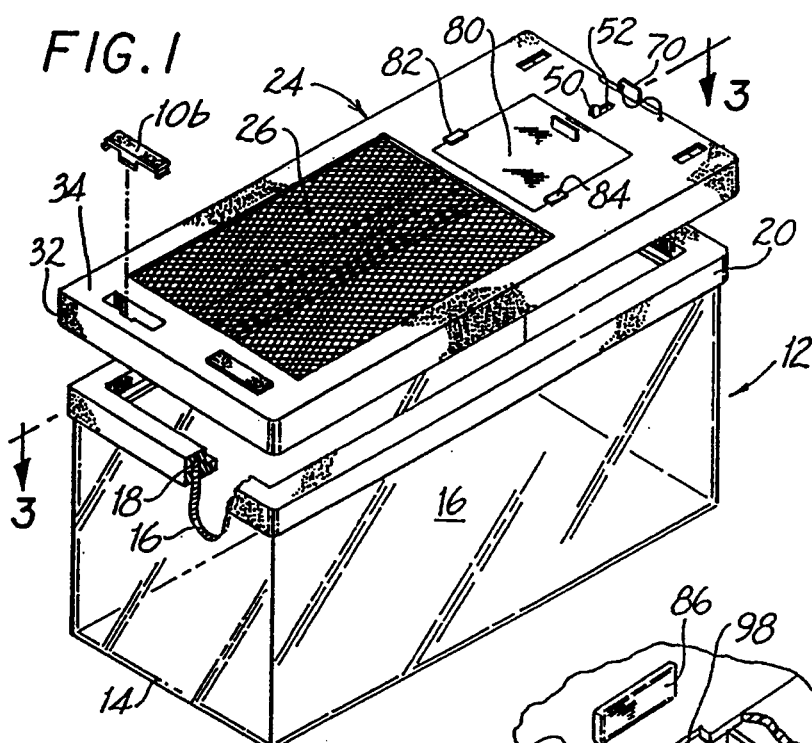
FIG. 1 is a partial sectional perspective view of an animal tank and cover embodying the present invention.

As seen in FIG. 1, the tank cover of the present invention, generally depicted by the numeral 10, is adapted to be seated on the top of a conventional animal tank, generally depicted by the numeral 12. The animal tank 12 is rectilinear in shape, although it may have any polygonal or other configuration. The tank is provided with a base 14 on which sits vertical glass or plastic walls 16, sealed so as to be watertight and airtight. The walls 16 are of equal height, presenting an open top surrounded by a continuous peripheral glass edge 18 on which is located a continuous peripheral band 20, preferably of plastic, although metal or even ceramic may be used. The band 20 is formed, as seen in cross section (FIG. 3), in an inverted U-shape, the vertical arms of which frictionally straddle the top edge 18 of the glass and which are secured thereto by epoxy resin of the like. Extending horizontally inward from the inner vertical arm is a shelf 22, providing a continuous rigid peripheral shelf about the interior of the tank, in which glass covers or other tank auxiliary components are normally hung. The other elements or construction of the tank are conventional, and since they do not bear upon the present invention, they are not described.

The tank cover 10 of the present invention comprises an elongated rectangular frame 24, conforming in shape to the top of the tank 12 and surrounding a flat central screen 26. The frame consists of a pair of parallel long sides 28 and transverse forward and rear small side 30 and 32, respectively, all of which in cross section have horizontal walls 34 adapted to rest on the band and have vertical side walls 36 depending therefrom to hang over the perimeter of the band 20. As is customary, the cover 10 is slightly larger in the lengthwise direction than that of tank 12. The screen 26 is affixed to the frame 24 by adhesion, heat sealing, or integral molding so as to securely cover the central opening and is of a mesh sufficient to allow air and light to circulate easily therethrough.

The horizontal wall portion, which is for convenience called the forward end 30 of the frame 24, the wall is enlarged to form a wide panel denoted by 34a. On the other hand, the wall 34 at the rear end 32 of the frame is enlarged to a lesser degree to provide a smaller panel denoted by 34b.

A pair of L-shaped brackets 38 depend by their long legs from the underside of the rear plate 34b and terminate in short tabs 40 which point to but are spaced from the interior surface of the vertical wall at this side edge. The long legs of the brackets 38 are of a length sufficient to permit the tabs 40 to come to rest just below the inwardly extending shelf 22 found on the band 20 when the cover is placed on the tank. Because the cover 10 is slightly longer than the tank, it may be shifted, if necessary, to permit the cover to first seat the tabs of the brackets 38 to then fall below the shelf 22. The tabs 40 are thus adapted to hook under the interior shelf 22 of the band 20 as illustrated in FIG. 3 so that the cover 10 cannot be lifted from the tank 12. A small cover 38a is placed to fit over the holes formed by the formation of the brackets 38.

Mounted below the larger plate 34a at the forward end 30 of the frame is a slide 42 held in parallel planar relationship to the panel 34a by a pair of L-shaped skids 44 fixed along each of the transverse edges of the slide to the panel 34a. The slide 42 is reciprocally moveable in the direction of the double arrow A. A pair of L-shaped brackets, forming hooks 46 similar to those at the rear end 32, depend directly from the slide 42. The hooks are formed with tabs 48, projecting toward the vertical wall at the forward end 30.

The slide 42 is provided with a handle 50 which projects upwardly therefrom through a slot 52 in horizontal portion 34a. Manipulation of handle 50 causes the slide 42 to be moved toward and away from the vertical wall at the forward end 30, moving the tabs 48 between an operative locked position below the shelf 22 of the band 20 and an inoperative open position remote therefrom. It will be obvious that the tongue 54 of the slide rides on the top edge of the tank. Therefore, when placed on the tank, the cover is slightly higher at the front end than at the rear end.

Figure 5:
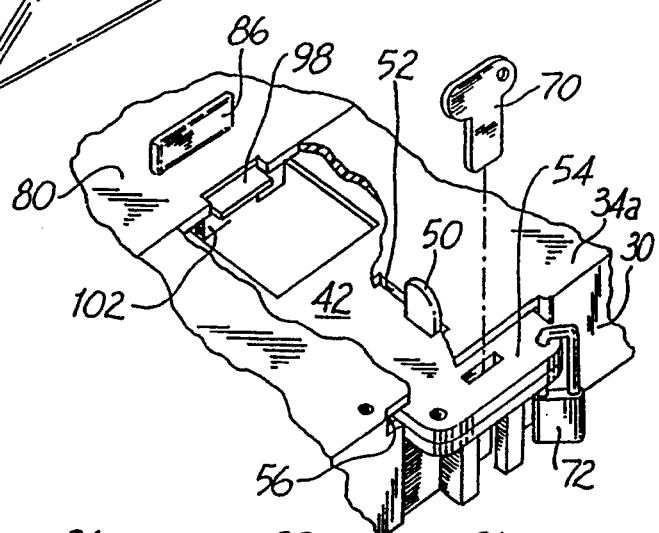
FIG. 5 is a partial sectional perspective view of the cover showing the locking mechanism in detail.
Figure 2:
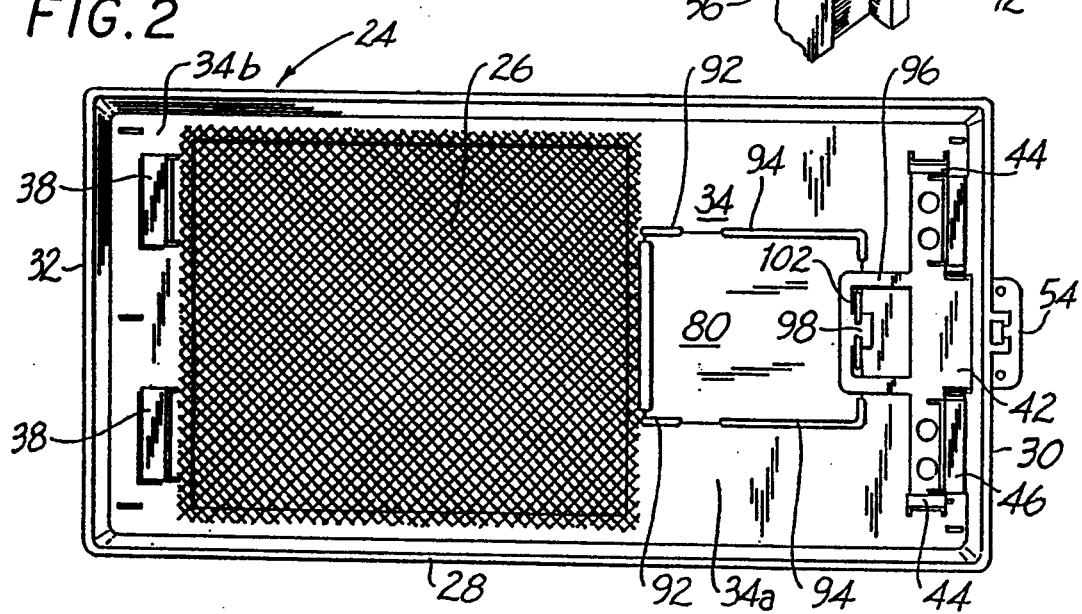
FIG. 2 is a perspective view of the underside of the cover showing in FIG. 1.

Projecting horizontally outward from the front of the slide 42 tongue 54, which is adapted to protrude through a horizontal slot 56 located in the vertical wall of the frame 24 at the forward end 30 (FIG. 5). Extending fixedly from the exterior surface of the vertical wall just below the slot 56 and in cooperation with the tongue 54 is a horizontal flange 58. Both the tongue 54 and the flange 58 have apertures 60 arranged to align when the slide 42 is moved forwardly into its locked position. The apertures 60 are adapted to receive a locking pin 70 or padlock 72 to secure the slide 42 in place.

In operation, the tank cover 10 is fitted to the tank 12 by first lowering the rear end 32 of the frame onto the top of the tank, using the slide handle 50 to hold the slide 42 in its open position. The rear end 32 is lowered and manipulated to cause the tabs 40 to engage below the shelf 22. As will be seen from FIG. 4, when the slide 42 is held in its open position, sufficient play between the tank cover 10 and the top of the tank exists, permitting the tabs 40 to be lowered below the shelf 22. The front end 30 is then lowered onto the top of the tank, and the slide 42 is then slid toward the forward end 30, causing its tabs 48 to engage underneath the interior peripheral shelf 22 at this end of the tank and the tongue 54 to move through the slot 56. The tongue 54 and the flange 58 may then be secured by pin 70 or padlock 72.

Once this is accomplished, the cover is securely held in place on the tank and cannot be removed either by the animal inside the tank or a person or child exterior of the tank. The only way to remove the cover is by conscious effort in removing the pin or padlock first. It will be observed that once the slide 42 is moved into operative position, the hooks 38 at the rear and the hooks 46 at the front are tensioned against each other and cannot, by vibration, animal pushing, or banging on the cover, be removed from their locked position. Of course, once the pin or padlock is removed, the cover can be easily removed.

The present cover has an advantage in that the same degree of locking will be effected on tanks having a range of lengths—that is, since the slide is movable over the width of the enlarged wall, a throw or transverse of several inches is possible to effect engagement is effective within the interior of the tank, the spacing of the depending vertical walls 36 of the frame from the face of the tank or the band 20 is not critical. An attempt to pry the cover off the tank from the outside is most difficult, if not impossible. The tensioning of the hooks in the opposite direction further adds to stability and security.

Referring again to the drawing, the tank cover previously described has a screen 26 of reduced area, thus providing a wider horizontal wall portion or panel 34a. As seen from the top, the modified cover is provided with a door 80 which bears against a pair of invented L-shaped skids 82 and 84 fixed along each of the transverse edges of the top surface of panel 34a and extending upwardly and inwardly from the upper surface of the panel 34a. The door is also provided with gripping means 86 extending upwardly from the upper surface thereof. On the other hand, door 80 is supported along its lower edges by L-shaped tabs 92, and 94 which extend downwardly and inwardly from the lower surfaces of horizontal panel 34a. Still further, in the modification, the slide 42 is provided with and inwardly extending portion 96 provided along its innermost edge with a tab 98 extending outwardly towards the locking portion thereof and which tab 98 cooperates with a pair of L-shaped tabs 102 extending downwardly and inwardly from the lower surface of the door, thus locking the door securely in place when the slide 42 is in its outermost position. Along the edge of the door opposite to the edge bearing the L-shaped tab 102 there is provided a downwardly and inwardly L-shaped ledge 104 which leans against the innermost edge of the extent of panel 34a. Thus, when slide 42 is moved to its unlocked position, the door can be raised by grasping the gripping means which the ledge 104 acts to support it while permitting it to pivot along its innermost edge.

Finally, in order to provide even more security against entry to or escape from a tank employing the cover of this invention the openings 38a left in the rear plate 34b by the formation of the hooks and tabs 38 and 40, respectively, can be closed by snap-in tabs 106 and, as well, the flange 58 and tongue 54 can be modified to receive a key. It can best be seen from the foregoing that the cover is provided not only with a screen but with an entrance door which is easy openable for the introduction of food into the tank. The door 80 is significantly small so that the reptile or inmate of the tank cannot escape and so that the user cannot get his hand or arm through the door into the tank. It is sufficiently large however, to permit the introduction of the food, water or the like. It is also noted that the door 80 is cooperatively engaged with the sliding plate 42 so that movement of the sliding plate will lock the door into position at the same time the frame is locked onto the tank. The key or padlock 72 thus can be used not only to insure that the frame cannot be removed but also to insure that the feeding door 80 will not be inadvertently opened.

It will also be understood that various modifications and changes will become obvious to those who are skilled in the art and that the foregoing disclosure should not be taken as limiting of the invention.

What is claimed is:

1. A cover for an animal tank, comprising a polygonal container open at its top, bordered by a continuous band, having an interior horizontally extending shelf, said cover comprising a flat frame having front, rear, and side edges arranged to conform in shape to the top of said tank and adapted to be seated over the band thereof, said frame having means depending therefrom at each of the front and rear edges and within the interior confines thereof adapted to engage below said interior shelf, the engaging means along at least one edge being movable in a direction toward and away from the edge between a first position removed from the shelf and a second position engaging below the shelf and tensioning said frame in closed position, a door formed in said frame near said at least one edge and means provided on both said door and said movable engaging means to interlock said door and said movable engaging means when said door is in a closed position.

2. A cover for an animal tank having an interior shelf along the top edge, comprising:
   a rectilinear frame, having a horizontal frame wall forming a top portion of said frame and a vertical frame wall depending from the perimeter of said horizontal frame wall;
   a pair of oppositely outward facing hook means depending underneath said horizontal frame wall, one of said pair of hook means adapted to engage the underside of the interior shelf of said tank near an end of said frame; and the other one of said pair of hook means being movably mounted at the opposite end of said frame for engaging the corresponding underside of the interior shelf, said frame being adapted to rest on the top of said tank with the vertical walls depending alongside the exterior thereof, said other one of said hook means being moveable between a first position wherein said other one of said hook means is out of engagement with the shelf and a second position wherein said second one of said hook means engages with and beneath the interior shelf to secure the cover to the top of the tank;
   a door located in the horizontal wall of said frame in proximity to said moveable hook means to provide a closeable opening for access into said tank, said door and proximate hook means having cooperating interlocking members to fixedly lock said door when said hook means is in the second position.

3. The cover according to claim 2, wherein the horizontal wall of said frame is formed with an access opening and L-shaped support members arranged about the sides of said opening depending from the horizontal wall of said frame, said door comprising a plate having an L-shaped flange at its rear edge, said plate being tiltable to place the rear edge below said horizontal wall and being slidable on said L-shaped support member.

4. The cover according to claim 3, wherein the means for interlocking the door the and associated hook means comprises a U-shaped member extending perpendicularly from said plate and a tab extending outward from said hook means releasably engaging said U-shaped member.

5. The apparatus according to claim 2, wherein said frame has a central opening enclosed by a screen.

6. The apparatus as set forth in claim 2, including means for securing the position of said moveable hook means in its second position comprising an apertured tongue extending horizontally outwardly from said hook means, said frame having a slot through which said apertured tongue passes and means for securing said tongue in the outward position.

7. The apparatus according to claim 6, wherein said frame is provided with a flange fixedly extending from the forward edge of said frame in cooperation with said tongue and is provided with apertures aligned with those in said tongue for simultaneous receipt of the securing means.

* * * * *